United States Patent
Antipa et al.

(10) Patent No.: US 11,297,059 B2
(45) Date of Patent: Apr. 5, 2022

(54) FACILITATING USER-CENTRIC IDENTITY MANAGEMENT

(71) Applicant: ADOBE INC., San Jose, CA (US)

(72) Inventors: Damien Antipa, Alsace (FR); Antonio Sanso, Allschiwll (CH)

(73) Assignee: ADOBE INC., San Jose, CA (US)

( * ) Notice: Subject to any disclaimer, the term of this patent is extended or adjusted under 35 U.S.C. 154(b) by 954 days.

(21) Appl. No.: 14/262,123

(22) Filed: Apr. 25, 2014

(65) Prior Publication Data

US 2015/0312257 A1  Oct. 29, 2015

(51) Int. Cl.
*G06F 15/173* (2006.01)
*H04L 29/06* (2006.01)

(52) U.S. Cl.
CPC .................................. *H04L 63/10* (2013.01)

(58) Field of Classification Search
CPC ............................... G06F 9/4451; G06F 21/31
See application file for complete search history.

(56) References Cited

U.S. PATENT DOCUMENTS

| | | | | |
|---|---|---|---|---|
| 8,544,072 B1* | 9/2013 | Masone | .............. | H04L 63/0815 726/10 |
| 9,043,886 B2* | 5/2015 | Srinivasan | ........................ | 726/6 |
| 9,276,869 B2* | 3/2016 | Dodd | ..................... | H04L 47/70 |
| 2006/0053296 A1* | 3/2006 | Busboom | .............. | H04L 63/083 713/182 |
| 2008/0270038 A1* | 10/2008 | Partovi | .................. | G06Q 10/00 702/19 |
| 2008/0294607 A1* | 11/2008 | Partovi | .................. | G06Q 30/00 |
| 2009/0049525 A1* | 2/2009 | D'Angelo | ........... | G06F 21/6245 726/4 |
| 2012/0110640 A1* | 5/2012 | Donelson | .............. | H04L 63/102 726/3 |
| 2013/0173712 A1* | 7/2013 | Monjas Llorente | ... | G06Q 10/00 709/204 |
| 2013/0204787 A1* | 8/2013 | Dubois | .................. | G06Q 20/40 705/44 |
| 2014/0129629 A1* | 5/2014 | Savir | ....................... | H04W 4/21 709/204 |
| 2014/0189808 A1* | 7/2014 | Mahaffey | ............ | H04L 63/0853 726/4 |

* cited by examiner

*Primary Examiner* — Umar Cheema
*Assistant Examiner* — Tesfu N Mekonen
(74) *Attorney, Agent, or Firm* — Shook, Hardy & Bacon L.L.P.

(57) ABSTRACT

Embodiments of the present invention provide systems, methods, and computer storage media for facilitating user-centric identity management. In this regard, various aspects of identity management are designed to be more transparent to users to bolster user assurance with respect to "behind-the-scenes" procedures of identity management. Generally, indications of data flow between service providers, identity providers, and/or user devices can be provided to the user device for presentation to the user. As a result, visual representations of data flow, notifications of data flow, or the like, can be presented to the user to expose various aspects of identity management. In some embodiments, users may be able to control aspects of identity management, for example, by confirming or preventing data flow between providers.

15 Claims, 11 Drawing Sheets

FACILITATING USER-CENTRIC IDENTITY MANAGEMENT

BACKGROUND

Sharing information between organizations has become a valuable tool, particularly with the increasing popularity of social networks. Information sharing enables an organization to obtain data from a third-party that the organization would otherwise be required to independently obtain, for example, from a user. Information sharing can also reduce repetitive data entry by users such that the same data does not need to be provided by the user to multiple organizations.

Identity management is utilized in an effort to provide secure information sharing between multiple organizations or entities. Identity management enables secure access to data or systems of another domain such that data is portable between domains. To securely permit data exchange among organizations, entities, or domains, identity management technologies facilitate authentication of users and/or authorization of data exchanged across organizations. Although identity management is intended to securely enable information sharing between organizations, users are oftentimes hesitant to utilize such technologies as the user is uninformed and/or apprehensive in regard to information being exchanged between the entities. For instance, some users are unfamiliar with the "behind-the-scenes" procedures of identity management, and some users are concerned about the type or scope of information being provided to and/or from a third-party identity provider. As a result, many users avoid use of such identity management technologies based on the uncertainties of data being exposed to potentially untrusted systems.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to facilitating user-centric identity management. In this regard, various aspects of identity management are designed to be more transparent to users to bolster user assurance with respect to "behind-the-scenes" procedures of identity management. Generally, indications of data flow between service providers, identity providers, and/or user devices can be provided to the user device for presentation to the user. As a result, visual representations of data flow, notifications of data flow, or the like, can be presented to the user to expose various aspects of identity management. In some embodiments, users may be able to control aspects of identity management, for example, by confirming or preventing data flow between providers.

BRIEF DESCRIPTION OF THE DRAWINGS

The present invention is described in detail below with reference to the attached drawing figures, wherein.

DETAILED DESCRIPTION

Figure 1:
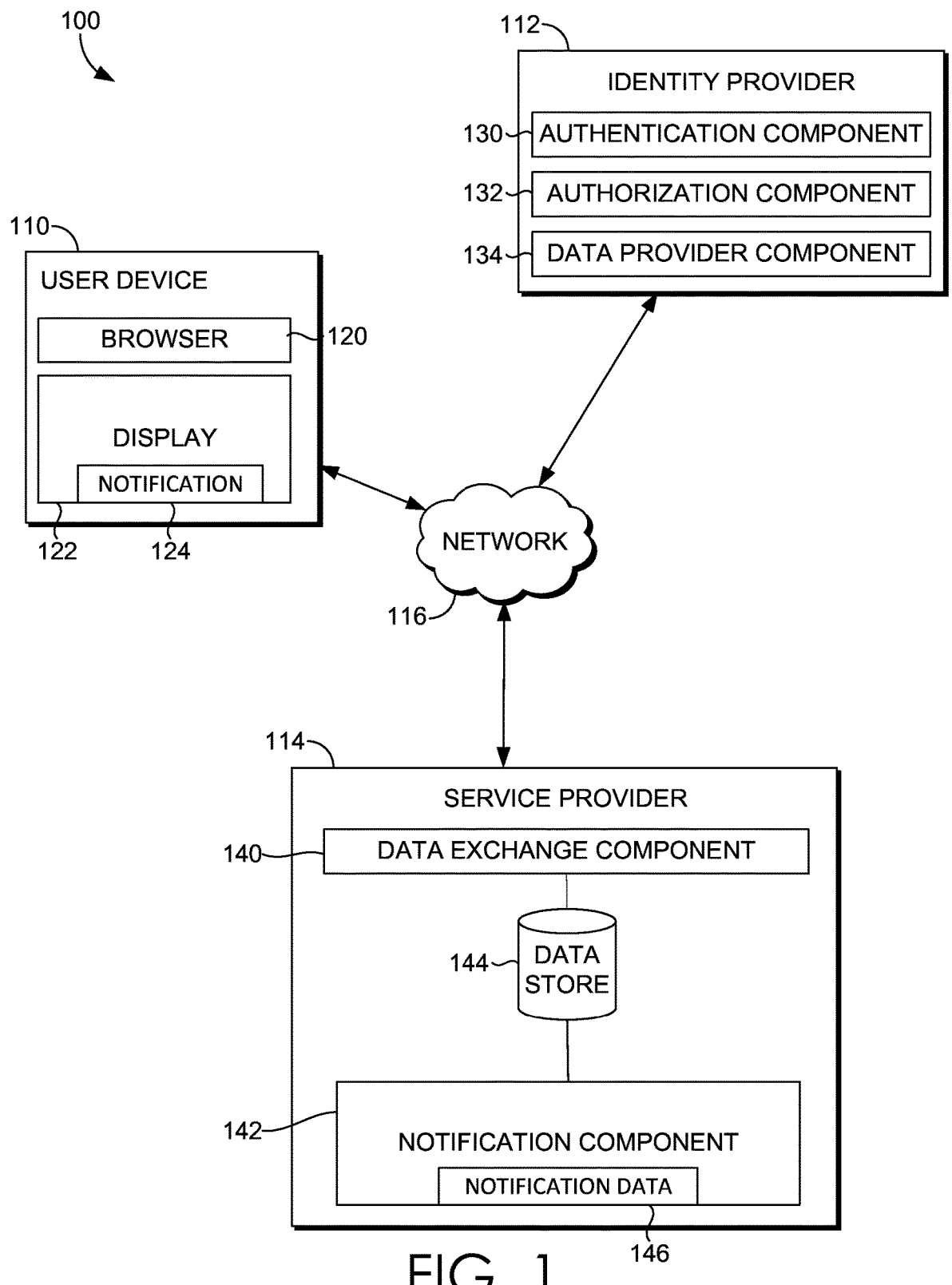
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Identity management is utilized in an effort to provide secure information sharing between multiple organizations or entities. Identity management enables secure access to data or systems of another domain such that user data is portable between domains. To securely permit data exchange among organizations, entities, or domains, identity management technologies facilitate authentication of users and/or authorization of user data exchanged across organizations. That is, identity management technologies permit a third-party identity provider to authenticate users and/or authorize access of a resource(s) (e.g., user data) in association with users accessing services provided by a service provider. In this way, in connection with a user device accessing services provided by a service provider (e.g., service provider 114 of FIG. 1), a third-party (e.g., identity provider 112 of FIG. 1) can perform user authentication and resource authorization thereby authenticating the user on behalf of the service provider and authorizing a service provider access to a resource(s).

Despite an effort to facilitate secure information sharing, users are oftentimes hesitant to utilize such technologies as the user is uninformed or apprehensive in regard to information being exchanged between the entities. For instance, some users are unfamiliar with the "behind-the-scenes" procedures, and some users are concerned about the type or scope of information being provided to and/or from the third-party identity provider. Many users avoid use of such identity management technologies based on the uncertainties of data being exposed to, perhaps, untrusted systems.

Embodiments of the present invention are directed to facilitating user-centric identity management. Identity management refers to managing information sharing between multiple organizations, entities, or domains. In this manner, identity management enables secure access to data or systems of another domain such that a resource(s) is portable between domains, entities, or organizations. Identity management can facilitate various aspects of information sharing, such as, for example, authentication of users, authorization of access to a set of resources, and/or data exchange of a set of resources between entities. In this manner, identity management can be employed to authenticate a user and authorize a web service provider to access a resource(s) from a third-party on behalf of the user. To do so, identity management can be used to control or manage user identity information and/or resource access, such as access to user data. Identities (e.g., user names and passwords) can be managed such that users can be authenticated. Access rights can also be managed to grant or issue appropriate access rights to entities.

A user-centric identity management can tailor various aspects of identity management, such as authorization of resources, to be more transparent to users. In this regard, a user operating a user device can be notified of and/or permitted to control aspects of identity management being performed, for instance, by an identity provider and/or a service provider. In particular, entities involved in a data exchange, communications between entities, scope or type of resources exchanged between entities, or the like, may be revealed or exposed to users. In some cases, the user might also have the opportunity to control aspects of identity management. For example, data exchange between an identity provider and a service provider may be permitted unless and until a user overrides the data exchange. As another example, data exchange between an identity provider and a service provider may be prevented until the user provides a confirmation to proceed or continue with the data exchange.

Embodiments of the present invention can be implemented irrespective of a specific method or technology employed for performing identity management between organizations. In this regard, aspects of the invention can be employed in a variety of different contexts. For instance, embodiments of the present invention can be implemented in identity management systems implemented as federated identity management or delegated identity management. Further, any number of identity management technologies may be used within the scope of embodiments of the present invention. Identity management technologies can include any number of protocols or implementations. Exemplary technologies used include Security Assertion Markup Language (SAML), OAuth, OpenID, as well as proprietary standards. OAuth, for example, provides a method for a service provider to access a resource(s) from an identity provider on behalf of a user. In this manner, OAuth provides a process for users to authorize a service provider to access a resource(s) without sharing their identity token, such as a username and password, with the service provider.

Further, embodiments of the invention can be employed in association with various aspects of identity management. For instance, one aspect of identity management includes single sign-on (SSO), in which a user's identity token, such as username and password, is trusted across multiple systems or organizations. Single sign-on technologies generally correspond to the authentication aspect of identity management. Single sign-on allows users to access multiple services with a same identity token. With single sign-on, when a user attempts to log into a service, instead of providing an identity token to the service provider, the service provider trusts a third-party identity provider to validate the identity token such that the user is not required to provide the identity token directly to an entity other than the identity provider.

Various terms are used throughout this description. Although more details regarding various terms are provided throughout this description, general definitions of some terms are included below to provider a clearer understanding of the ideas disclosed herein:

Identity management generally refers to managing information sharing between organizations, entities, or domains. Identity management may include various aspects of information sharing including, for example, authentication, authorization, and data exchange.

Authentication generally refers to verifying that an entity or user is as claimed. In this regard, authentication includes confidently or positively identifying a user presenting evidence of his or her identity. Authentication may be achieved by proving possession of a unique token or attribute to the identity provider performing the authentication.

Authorization generally includes determining a scope of a resource(s) that can be accessed and/or the manner in which the resource(s) can be accessed. In this regard, authorization manages and/or controls access to resources.

An identity provider refers to a provider that manages identity information for users. An identity provider can perform authentication and/or authorization on behalf of a service provider such that a user does not need to provide an identity token (e.g., user credentials) to the service provider.

A service provider refers to a provider that provides services to a user device. As described herein, the service provider reduces or eliminates management of identity information for users by permitting a third-party identity provider to perform such identity information management.

An identity-management notification refers to a notification pertaining to a particular identity management aspect or procedure being performed or about to be performed. Identity-management notifications are generally presented on a user device to notify the user regarding "behind-the-scenes" implementations of identity management and/or to enable user control thereof.

In accordance with various aspects of the invention, one embodiment of the present invention is directed to one or more computer storage media storing computer-useable instructions that, when used by one or more computing devices, cause the one or more computing devices to perform operations. The operations include prior to accessing one or more resources stored in association with an identity provider, providing an indication from a service provider to a user device that access to the one or more resources is to be provided to a service provider; and communicating with the identity provider to access the one or more resources.

In another embodiment of the invention, an aspect is directed to a method. The method includes in accordance with a first communication between a service provider that provides a service to a user device and a third-party identity provider that authorizes access to resources associated with a user of the user device, providing an indication of the first communication to the user device to expose the first communication between the service provider and the third-party identity provider to the user of the user device. The method also includes in accordance with a second communication between the service provider and the third-party identity provider, providing an indication of the second communication to the user device to expose the second communication between the service provider and the third-party identity provider to the user of the user device. In embodiments, the first communication and the second communication between the service provider and the third-party identity provider facilitate access to one or more resources stored in association with the third-party identity provider being provided to the service provider.

A further embodiment is directed to a system that includes one or more processors; and one or more computer storage media storing computer-useable instructions that, when used by the one or more processors, cause the one or more processors to: communicate data to the user device for use in rendering a visual representation of at least a portion of a data flow between a user device, a service provider, and an identity provider, wherein the service provider provides a service to the user device and the identity provider authenticates a user of the user device and authorizes the service provider to access resources stored in association with the identity provider; and communicate to the user device an indication of a set of one or more resources provided to or to be provided to the service provider from the identity provider in accordance with the identity provider authorizing access to the service provider.

Having briefly described an overview of embodiments of the present invention, an exemplary computing environment in which some embodiments of the present invention may be implemented is described below in order to provide a general context for various aspects of the present invention.

Referring initially to FIG. 1 in particular, an exemplary computing environment for implementing embodiments of the present invention is shown and designated generally as computing environment 100. Computing environment 100 is but one example of a suitable computing environment and is not intended to suggest any limitation as to the scope of use or functionality of the invention. Neither should the computing environment 100 be interpreted as having any dependency or requirement relating to any one or combination of components illustrated.

Exemplary computing environment 100 provides an environment in which some embodiments of the present invention may be employed. Generally, the computing environment 100 illustrates an environment that facilitates user-centric identity management. In this regard, a user operating a user device can be notified of and/or control aspects of identity management being performed by an identity provider and/or a service provider in an effort to provide or obtain a set of resources.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed may be carried out by hardware, firmware, and/or software. For instance, various functions may be carried out by a processor executing instructions stored in memory.

Among other components not shown, the computing environment 100 includes a user device 110, an identity provider 112, and a service provider 114. It should be understood that the environment 100 shown in FIG. 1 is an example of one suitable computing environment. Each of the components shown in FIG. 1 may be implemented via any type of computing device, such as computing device 200 described with reference to FIG. 2, for example. The components may communicate with each other via a network(s) 116, which may include, without limitation, one or more local area networks (LANs) and/or wide area networks (WANs). Such networking environments are commonplace in offices, enterprise-wide computer networks, intranets, and the Internet. It should be understood that any number of user devices, identity providers, and service providers may be employed within the computing environment 100 within the scope of the present invention. Each may comprise a single device or multiple devices cooperating in a distributed environment. For instance, the service provider 114 may be provided via multiple devices arranged in a distributed environment that collectively provide the functionality described herein. As another example, multiple identity providers 112 may exist, for instance, to be located in remote locations, to increase capacity, or to correspond with distinct information (e.g., user data). Additionally, other components not shown may also be included within the network environment.

In implementing user-centric identity management, the user device 110 enables notifications and/or control aspects of identity management. In this manner, the user device 110 can facilitate providing identity-management notifications via a display of the user device 110 as well as enabling user control of data exchange between the identity provider 112 and the service provider 114.

The user device 110 may include any type of computing device, such as the computing device 200 described with reference to FIG. 2, for example. Generally, the user device 110 includes a browser 120 and a display 122. The browser 120 is configured to render a web page, such as a web page associated with or provided by the service provider 114 and/or identity provider 112, in association with the display 122 of the user device 110.

In accordance with embodiments of the present invention, the browser 120 provides identity-management notifications. An identity-management notification provides a notification or indication of an aspect of identity management being performed or about to be performed, for example, in association with an identity provider, such as identity provider 112, or a service provider, such as service provider 114. Such an identity-management notification 124 is displayed to a user of the user device 110 via the display 122. By way of example, and without limitation, an identity-management notification might provide a notification or indication of entities involved in a data exchange, communications between entities (e.g., service provider 114 and identity provider 112), scope or type of resources exchanged between entities, or the like. As will be described in more detail below, in addition to notifying the user regarding a particular identity management procedure, the identity-management notification might also permit a user to control aspects of identity management. For instance, an identity-management notification might permit a user to discontinue provision of a set of resources or require confirmation to continue provision of a set of resources.

An identity-management notification may include any type or amount of data. By way of example only, and without limitation, an identity-management notification may include an identity token; an indication of an identity provider (e.g., that provides data); an indication of a service provider (e.g., to which data is provided); an indication of a communication between a service provider, an identity provider and/or a user device; an indication of scope of resources or set of resources that may be or to be transmitted to the service provider, or the like.

In operation, to render an identity-management notification, the browser 120 can receive notification data or indicators. Notification data or indicators refer to any data or indications for use in an identity-management notification or to generate an identity-management notification. In embodiments, such notification data can be provided by an identity provider, such as identity provider 112, or a service provider, such as service provider 114. An identity provider and/or service provider may provide notification data to a user device, for example, upon a request to authenticate a user and/or authorize transfer of a resource(s) on behalf of a service provider. For example, assume a user provides an indication to view a web page associated with a service provider (e.g., inputs a URL, web address, IP address, etc. or selects a link associated with a web page). Further assume that the user provides login credentials, such as user name and password, corresponding with the identity provider such that the identity provider can perform the authentication and authorization. In accordance with initiating authentication and/or authorization by a third-party identity provider, notification data can be provided to the browser 120 of the user device 110. Such notification data might be provided by the identity provider 112 and/or the service provider 114.

Upon receiving notification data, the browser 218 can be used to generate or render a corresponding identity-management notification for display on the user device 110. The display 122 of the user device 110 displays the identity-management notification(s). An identity-management notification(s) can be displayed prior to, upon, or concurrent to rendering a web page, such as a web page associated with the service provider.

In addition to browser 120 providing identity-management notifications, the browser 120 may also enable user interaction with the identity-management notifications. For example, the browser 120 might receive user interactions with an identity-management notification, such as, for example, a selection to confirm or acknowledge the notification in order to permit the authentication, authorization, and/or resource provision to continue. As another example, the browser 120 might receive user interactions with an identity-management notification to prevent or discontinue at least a portion of identity management, such as authentication, authorization, and/or resource provision.

In this regard, upon presenting an identity-management notification, a user may select a confirmation indication to confirm proceeding with identity management, or portion thereof, or a termination indication to discontinue or cancel identity management, or a portion thereof. Selecting an indicator (e.g., a confirmation or termination indication) may occur in any number of ways. For example, a selecting device, such as a mouse or other selector, may be used to position a selector (e.g., a cursor) over an indicator followed by a selection of a button to indicate selection of an indication. In another example, an indication may be selected by hovering a cursor or other selector over an indicator, for example, for a predetermined amount of time. In other embodiments having a touch-screen display, a user digit, such as a finger, or a stylus may be used to initiate contact with an area on a display screen corresponding with the indication.

An identity-management notification can be presented in any number of locations with a display screen. For example, the identity-management notification might overlay a web page near the center or an edge. Further, an identity-management notification can be presented in any format. For instance, an identity-management notification may be presented as text or an image within a text box or window. As another example, an identity-management notification might be included as part of a tool bar. In yet another example, an identity-management notification might be integrated with or overlayed on a webpage. These are only examples, and a location at which or manner in which an identity-management notification is presented is not intended to limit the scope of embodiments of the present invention.

It should be noted that the functionality described herein as being performed by the browser 120 may be performed by any other application capable of rendering content, for example, provided by the service provider 114 and/or identity provider 112. In this way, the functionality described herein as being performed by the browser 120 may be performed, or partially performed, by an application or operating system running on the user device 110. Any and all such variations, and any combination thereof, are contemplated to be within the scope of embodiments of the present invention.

The identity provider 112 is configured to facilitate various aspects of identity management. In particular, the identity provider 112 can perform authentication and/or authorization in association with requests received from user devices, for instance, the browser 120 associated with the user device 110. In embodiments, the identity provider 112 can be any provider that creates, maintains, and/or manages identity information for users. In this manner, the identity provider 112 can authenticate a user of a user device on behalf of a service provider, such as service provider 114. Additionally or alternatively, the identity provider 112 can authorize provisioning of a set of resources to a service provider, such as service provider 114, and facilitate such provision. Those skilled in the art of the present invention will recognize that the identity provider may be implemented with any number of additional functionality. For example, the identity provider 112 may also provide services, such as search functionality (e.g., a search engine), social networking functionality, or the like, or be associated therewith.

As illustrated, the identity provider 112 includes an authentication component 130, an authorization component 132, and a data provider component 134. The illustrated components may also have access to a data store (not shown). Such a data store may be configured to store data. In various embodiments, such information may include, without limitation, resources (e.g., user data), identity tokens, authentication codes, access tokens, and the like. In embodiments, the data store is configured to be searchable for one or more of the items stored in association therewith. It will be understood and appreciated by those of ordinary skill in the art that the information stored in association with the data store may be configurable and may include any information relevant to identity management. The content and volume of such information are not intended to limit the scope of embodiments of the present invention in any way. Further, the data store may, in fact, be a plurality of storage devices, for instance a database cluster, portions of which may reside in association with the identity provider 112 or another external computing device, and/or any combination thereof.

The authentication component 130 is configured to authenticate users. In this regard, the authentication component 130 verifies that an entity or user is as claimed. As such, authentication can include recognizing and verifying the identity of a user. Authentication might be performed using an identity token that identifies the user. An identity token may be any unique identifier that indicates or specifies a user. As can be appreciated, identity tokens may include any type of technology including, for example, user credentials (e.g., a login name and password), biometrics (e.g., fingerprint), gestures (e.g., touch or air gestures), other distinctive behaviors, or the like.

In embodiments, the authentication component 130 receives an identity token from the user device 110. The identity token may be provided in association with a user login request from the user device 110, a request for an authorization code, or the like. In response to receiving an identity token, login request, and/or authentication request, the authentication component 130 can authenticate or verify the user utilizing such an identity token (e.g., login name and password). In some cases, the authentication component 130 may provide an authentication indicator to the user device and/or the service provider 114, for example, to be presented as an identity-management notification. An authentication notification can provide an indication or notice that authentication of the user has been performed, verified, or completed. As such, an identity-management notification in the form of authentication notification can be displayed to a user via the user device 110.

The authorization component 132 is configured to facilitate authorization. In this way, the authorization component 132 authorizes the user device 110 and/or service provider 114 to access a set of one or more resources. Authorization may include determining a scope of resources that can be accessed and/or manner in which the resource(s) can be accessed. Stated differently, the authorization component 132 can manage authorization information that defines what operations an entity can perform in the context of a specific application. For example, one entity (e.g., first service provider) might be authorized to obtain a first set of data while another entity (e.g., second service provider) might be authorized to access a second set of data.

In some implementations, the authorization component 132 might perform authorization automatically upon completing authentication of the user. In other implementations, the authorization component 132 might perform authorization in response to receiving a request for an authorization code, for example, via the user device 110. For instance, the user device 110 might provide a request for an authorization code to the identity provider 112. By way of example, assume that a user of the user device 110 selects a link from a web page of the service provider 114 that indicates a preference to login to the service provider 114 via the identity provider 112. Upon selecting to login via the identity provider 112, the service provider 114 can provide a request for an authorization code to the user device 110, which, in turn, can provide a request for an authorization code to the identity provider 112. An authorization code request may include, for example, a response type, a redirect URI, a service provider identifier, and/or the like.

Irrespective of how authorization is initiated, the authorization component 132 can generate and/or provide an authorization code, for example, to the user device 110. An authorization code refers to any code or value that can be used to obtain an access token. An authorization code may include any number of values or any format of values and is not intended to limit the scope herein. As can be appreciated, in some cases, the authorization code might not be provided until a user at the user device 110 confirms authorization of the service provider 114. In this regard, an authorization indicator may be provided to the user device to prompt the user to authorize the service provider 114, for example, in response to requesting an authorization code from the identity provider 112. As such, an identity-management notification in the form of an authorization notification can be displayed to request user permission to authorize the service provider 114. An authorization notification for authorizing the service provider 114 may also include a scope parameter that indicates the set of resources and/or operations that an access token may permit. The authorization component 132 might identify a resource scope and provide such a resource scope to the user device 110 along with, prior to, or subsequent to communicating the authorization code to the user device 110. Such a resource scope may be identified, for example, via an algorithm or look up system (e.g., a data store) to obtain an appropriate resource scope in association with the service provider 114, user preferences of the user, and/or the like.

Although the authorization component 132 is described above as providing an authorization code, this is only one example of an implementation that might be employed by identity management and is not meant to limit the scope of embodiments described herein. For example, rather that transmitting an authorization code used to, thereafter, obtain an access token, in some embodiments, the authorization component 132 can directly transmit or provide an access token for use in obtaining resources. Further, communications can be transmitted through a user device or directly to a service provider.

The data provider component 134 is configured to facilitate data exchange or resource provisioning between the identity provider 112 and the service provider 114. As described in more detail below, the data provider component 134 can be engaged by the service provider 114 to provide resources to the service provider 114. For instance, the data provider component 134 may receive a request for an access token from the service provider 114. Such an access token request may include an authorization code. Upon receiving the access token request and/or authorization code, the data provider component 134 can access, identify, determine, or generate an access token for providing to the service provider 114, for example, using the authorization code. An access token can permit the service provider 114 to access resources stored in association with the identity provider 112. Upon providing an access token to the service provider 114, the data provider component 134 may receive a resource request from the service provider 114. The resource request received by the data provider component 134 may include the access token previously provided to the service provider 114. In response to the resource request and/or the access token, the data provider component 134 can identify, determine, or access a set of one or more resources to provide to the service provider 114. The set of one or more resources to provide to the service provider 114 may be determined based on, for example, the access token, a service provider identifier that uniquely identifies the service provider 114, the identity token that uniquely identifies the user, user preferences, the resource scope, and/or the like. A resource scope refers to an extent or type of resource(s) permitted to be accessed. A resource scope may be affiliated with a particular user, a particular service provider, etc. For example, a user or developer may specify a first resource scope for a first service provider and a second resource scope for a second service provider. Types of resources may include, for example, images, photographs, videos, media, user profiles, user browsing history, social media postings, user link selections, user search queries, or the like.

As can be appreciated, the data provider component 134 may also be configured to provide notification data or indicators to the user device 110 to relay any details regarding an identity management procedure occurring in association with the data provider component 134. For example, notification data may be provided that pertains to receipt of an access token request from a service provider, communication of an access token to a service provider, receipt of a resource request, a scope of resources communicated or to be communicated, communication of a set of one or more resources, or the like.

Turning to the service provider 114, the service provider 114 generally provides services, such as a website, webpage, and/or services associated therewith, to the user device 110. For example, assume that a user of the user device 110 desires to access services provided by the service provider 114. In such a case, the user navigates to a corresponding webpage associated with the service provider 114 to access services associated therewith. The service provider 114 is configured to receive and respond to requests that it receives from components associated with the user device 110, for instance, the browser 120 associated with the user device 110. Those skilled in the art of the present invention will recognize that the present invention may be implemented with any number or type of service providers.

In addition to providing services to the user device 110, the service provider 114 is also generally configured to facilitate various aspects of user-centric identity management. In embodiments, the service provider 114 includes functionality to facilitate data exchange or resource provisioning in connection with the identity provider 112 and to provide identity-management notifications to the user device 110 in an effort to expose aspects of identity management procedures and resource scope to the user of the user device 110 and, in some cases, enable control thereof.

As illustrated, the service provider 114 includes a data exchange component 140 and a notification component 142. The illustrated components may also have access to a data store 144. Such a data store 144 may be configured to store data. In various embodiments, such information may include, without limitation, resources (e.g., user data), identity tokens (e.g., user credentials), access tokens, scope parameters, and the like. In embodiments, the data store 144 is configured to be searchable for one or more of the items stored in association therewith. It will be understood and appreciated by those of ordinary skill in the art that the information stored in association with the data store may be configurable and may include any information relevant to identity management. The content and volume of such information are not intended to limit the scope of embodiments of the present invention in any way. Further, though illustrated as a single, independent component, the data store may, in fact, be a plurality of storage devices, for instance a database cluster, portions of which may reside in association with the service provider 114 or another external computing device, and/or any combination thereof.

Generally, the data exchange component 140 is configured to obtain data or resources from the identity provider 112. To obtain a set of one or more resources from the identity provider 112, the service provider 114 may communicate with the identity provider 112, for example, via the network 116.

In some implementations, the data exchange component 140 receives an authorization code from the user device 110. By way of example only, in association with the user device 110 receiving an authorization code from the identity provider 112, the browser 120 of the user device 110 can be redirected (e.g., via HTTP 302) to the service provider 114 along with the authorization code.

In response to receiving an authorization code, the data exchange component 140 can utilize the authorization code to obtain an access token from the identity provider 112. In this regard, the data exchange component 140 might communicate an access token request along with the authorization code to the identity provider 112. In response, the identity provider 112 can exchange the authorization code for an access token. That is, upon the identity provider 112 receiving an authorization code, the identity provider can generate, determine, identify, or select an access token and issue such a token to the data exchange component 140. The access token can permit the service provider 114 to access data associated with the identity provider 112. As can be appreciated, additional data may be provided along with the access token, such as, for example, a type of access token, an amount of time or a time at which the access token expires, a refresh token that may be used to obtain a new access token after the previous access token expires, etc.

Upon receiving an access token from the identity provider 112, the data exchange component 140 may utilize the access token to request a set of resources from the identity provider 112. In some embodiments, the data exchange component 140 communicates a resource request prior to, upon, or along with communicating an access token to the identity provider 112. In response to the data provider component 134 of the identity provider 112 receiving the resource request and/or the access token, the data provider component 134 can provide a set of one or more resources to the requesting service provider 114. In some cases, the scope of resources to return may be included in association with communicating the access token to the identity provider 112. For instance, a resource request may include a desired scope of resources to obtain from the identity provider 112. In other cases, the identity provider 112 might identify the scope of resources, for instance, based on the service provider 114 requesting resources, user permissions, user preferences, or the like. The resources to return to the service provider 114 can be received or retrieved from a data store of the identity provider, for example, in accordance with the identified scope of resources to provide to the service provider 114. The service provider 114 can then store such resources in the data store 114.

As can be appreciated, although the data exchange component 140 is described herein as utilizing an authorization code to obtain an access code that can thereafter be used to obtain a set of resources, any number of implementations can be used to obtain resources from the identity provider 112. For example, in some embodiments, the data exchange component 140 may receive an access token by way of the user device 110 such that exchange of an authorization code for an access token is not required. In such an embodiment, upon receiving an access code via the user device 110, the service provider 114 can request a set of resources.

The notification component 142 is configured to communicate with the user device 110 to provide transparency regarding aspects of identity management. To this end, the notification component 142 can provide notification data 146 or indicator to the user device 110 that indicate details regarding the identity management implementation, for instance, between the identity provider 112 and the service provider 114. As previously described, such notification data 146 or indicator can be used by the user device 110 to display an identity-management notification 124 to the user of the user device 110.

Notification data 146 may provide an indication of an aspect of identity management being performed or about to be performed, for example, in association with an identity provider, such as identity provider 112, or a service provider, such as service provider 114. By way of example, and without limitation, notification data might provide an indication of entities involved in a data exchange, communications between entities (e.g., service provider 114 and identity provider 112), scope or type of resources exchanged or to be exchanged between entities, or the like. In this regard, notification data may include data for use in rendering an authentication notification, an authorization notification, an access token notification, a resource notification, or the like. By way of example, notification data for use in rendering an authentication notification may indicate confirmation of user authentication. Notification data for use in rendering an authorization notification may indicate that authorization has been requested or completed and/or that an authorization code has been requested or received. Notification data for use in rendering an access token notification may indicate that an access token has been requested or that an access token has been received. Notification data for use in rendering a resource notification may indicate that a set of one or more resources has been requested or that a set of one or more resources has been received. These are merely examples of notification data that might be provided to the user device for use in rendering an identity-management notification(s) and are not intended to limit the scope of embodiments of the present invention.

As described, notification data may also include an indication of a resource scope to be accessed or obtained. To provide a scope or type of resources to be accessed by the service provider 114, a data store, such as data store 144, containing resource scopes may be accessed. In some embodiments, data store 144 contains a mapping of resource scopes to one or more identity providers. For instance, a first identity provider may correspond with a first resource scope (e.g., photographs), while a second identity provider may correspond with a second resource scope (e.g., user profile). Alternatively or additionally, a data store may contain a mapping of resource scopes to one or more users or user devices such that user preferences or permissions designate an appropriate scope of resources that can be accessed by the service provider. Resource scopes can be any extent or type of resources and are not intended to be limited to resources described herein. Examples of resource types may include, for instance, images, photographs, videos, media, user profiles, user browsing history, social media postings, user link selections, user search queries, or the like. Further, resource scopes can additionally or alternatively be described in other manners, such as date and/or time. For example, a resource scope may include any images posted within the last year.

The notification component 142 may additionally or alternatively provide data that can be used by the user device 110 to render a visual representation of the data flow between the parties. In this regard, the identity-management notification provided to the user is in the form of a visual or graphical representation illustrating the flow of data between the user device, identity provider, and/or service provider. For instance, the notification component 142 may provide an indication as to when an authorization code is received by the user device 110 and another indication as to when an authorization code is provided to the identity provider 112. Such information may then be utilized by the user device to render a graphical or visual indication of such communications.

Notification data for an identity-management notification may be provided by the notification component 142 at any time in order to provide exposure to aspects of identity management that have been performed or that will be performed. For example, notification data for an authentication notification may be provided prior to an authentication request or upon an authentication request to indicate completion of authentication. Notification data for an authorization notification may be provided prior to requesting authorization, upon receiving an indication that authorization is completed, prior to requesting an authorization code, or upon receiving an authorization code at the service provider 114. Notification data for an access token notification may be provided prior to requesting an access token or upon receiving an access token. Notification data for a resource notification may be provided prior to requesting a set of resources or upon receiving a set of resources.

Notification data provided from the notification component 142 to the user device 110 might also include data that permits a user to control aspects of identity management. For instance, notification data might permit a user to discontinue provision of a set of resources to the service provider 114 or require confirmation to continue provision of a set of resources to the service provider 114.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 2:
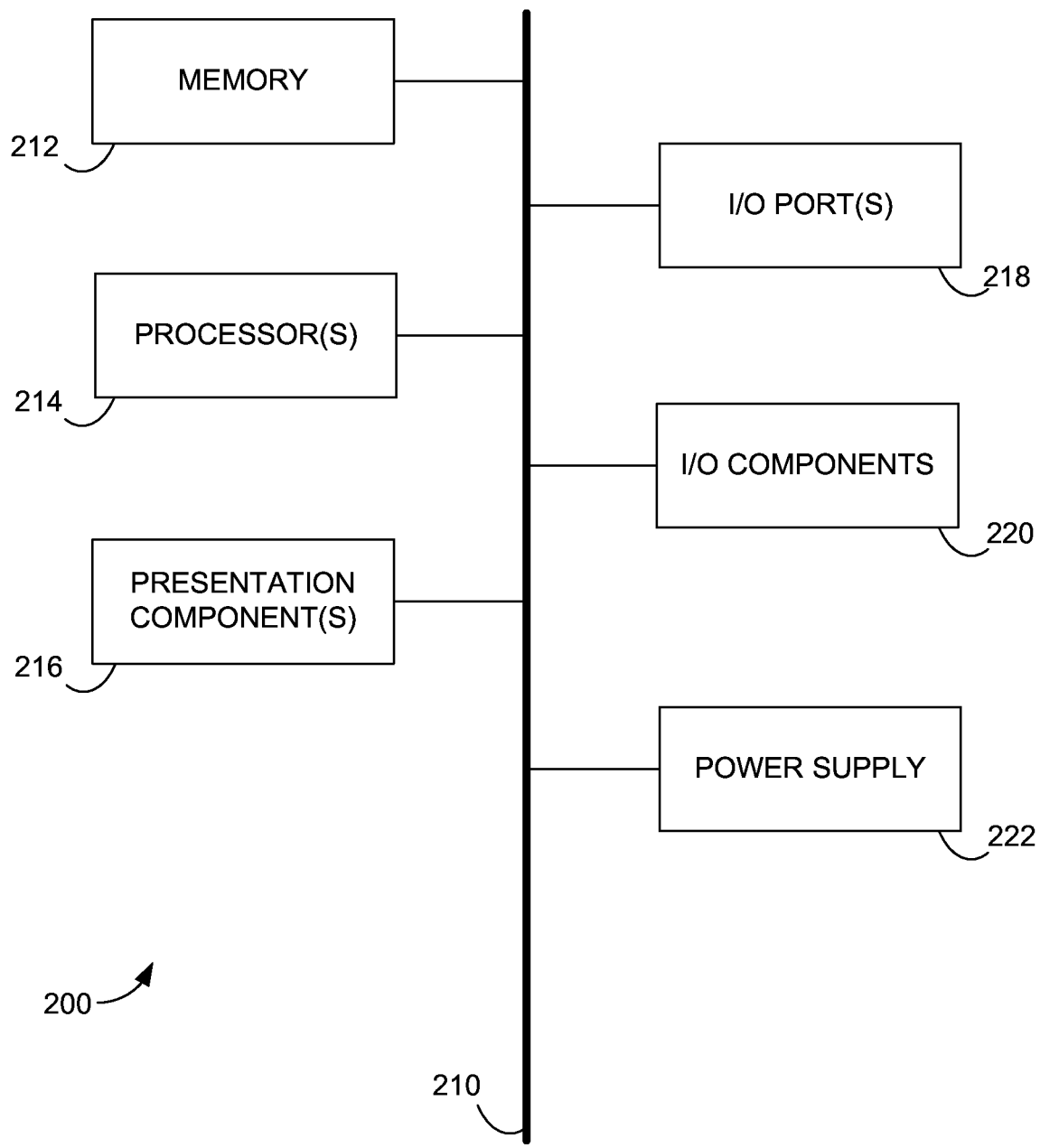
FIG. 2 is a block diagram of an exemplary operating environment suitable for use in implementing embodiments of the present invention.

Accordingly, referring generally to FIG. 2, an exemplary operating environment for implementing embodiments of the present invention is shown and designated generally as computing device 200. Computing device 200 is but one example of a suitable computing environment and is not intended to suggest any limitation as to the scope of use or functionality of the invention. Neither should the computing device 200 be interpreted as having any dependency or requirement relating to any one or combination of components illustrated.

With reference to FIG. 2, computing device 200 includes a bus 210 that directly or indirectly couples the following devices: memory 212, one or more processors 214, one or more presentation components 216, input/output (I/O) ports 218, input/output components 220, and an illustrative power supply 222. Bus 210 represents what may be one or more busses (such as an address bus, data bus, or combination thereof). Although the various blocks of FIG. 2 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 2 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 2 and reference to "computing device."

Computing device 200 typically includes a variety of computer-readable media. Computer-readable media can be any available media that can be accessed by computing device 200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 212 includes computer-storage media in the form of volatile and/or nonvolatile memory. The memory may be removable, non-removable, or a combination thereof. Exemplary hardware devices include solid-state memory, hard drives, optical-disc drives, etc. Computing device 200 includes one or more processors that read data from various entities such as memory 212 or I/O components 220. Presentation component(s) 216 present data indications to a user or other device. Exemplary presentation components include a display device, speaker, printing component, vibrating component, etc.

I/O ports 218 allow computing device 200 to be logically coupled to other devices including I/O components 220, some of which may be built in. Illustrative components include a microphone, joystick, game pad, satellite dish, scanner, printer, wireless device, etc. The I/O components 220 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 200. The computing device 200 may be equipped with depth cameras, such as, stereoscopic camera systems, infrared camera systems, RGB camera systems, and combinations of these for gesture detection and recognition. Additionally, the computing device 200 may be equipped with accelerometers or gyroscopes that enable detection of motion. The output of the accelerometers or gyroscopes may be provided to the display of the computing device 200 to render immersive augmented reality or virtual reality.

Figure 3:
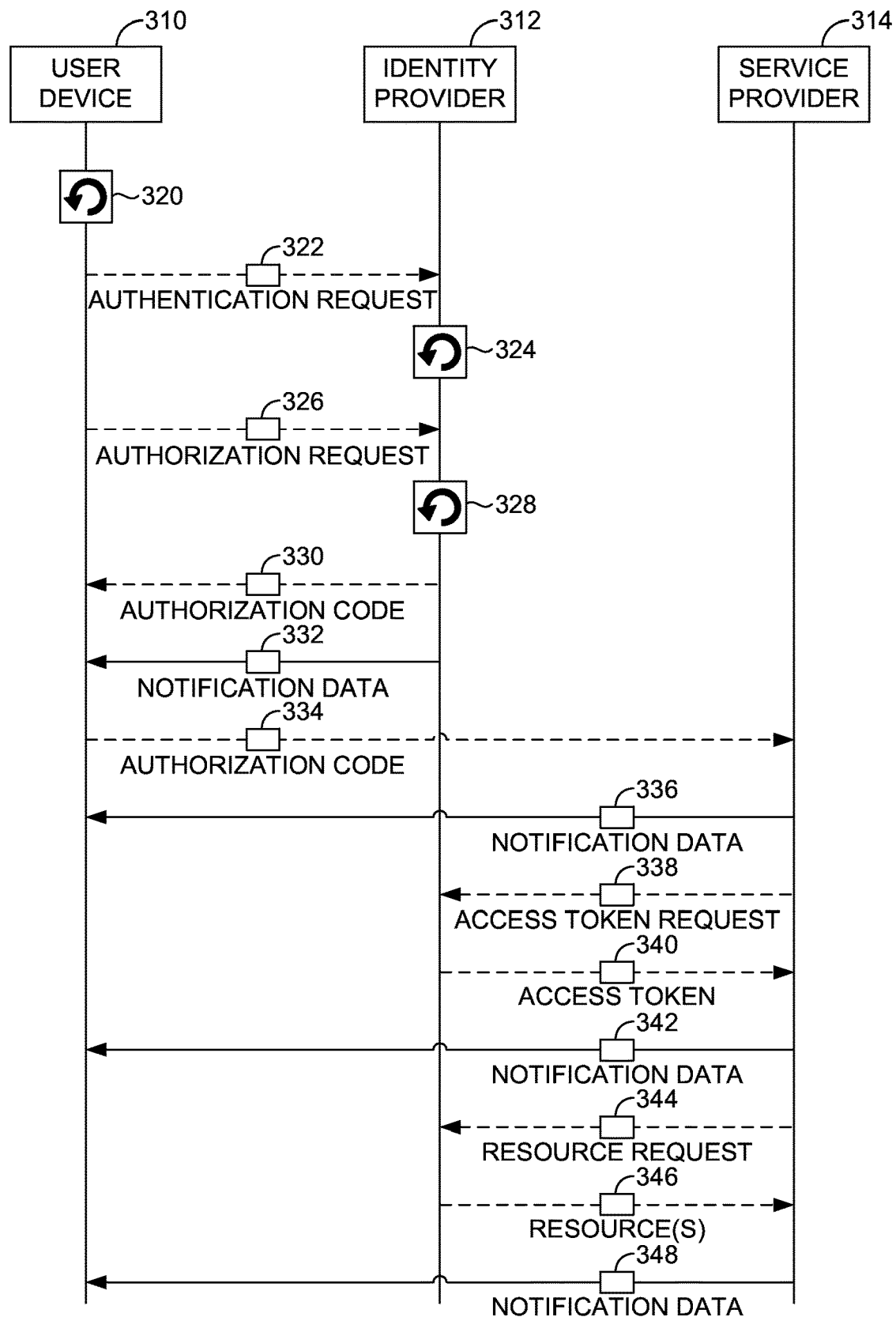
FIG. 3 depicts a flow diagram for use in implementing embodiments of the present invention.
Figure 4:
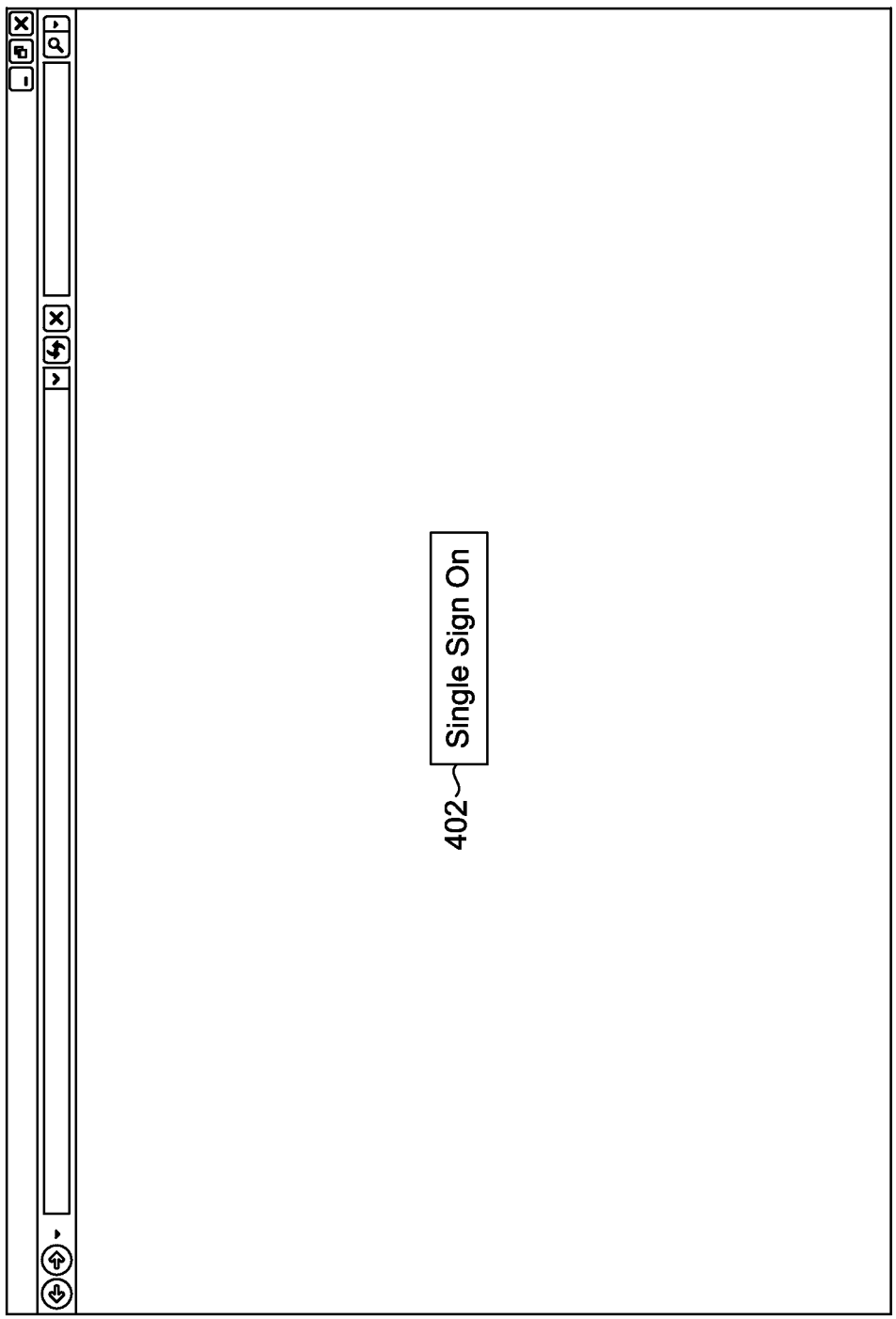
FIG. 4 is an exemplary user interface presenting an option to utilize a single sign-on implementation, in accordance with embodiments of the present invention.

Turning now to FIG. 3, an exemplary flow diagram illustrating a method for implementing user-centric identity management is generally depicted. The flow diagram includes a user device, generally depicted by numeral 310; an identity provider, generally depicted by numeral 312; and a service provider, generally depicted by numeral 314. The devices and components depicted within FIG. 3 are comparable to the devices and components of similar name previously discussed with reference to FIG. 1.

Initially, the user device 310 processes 320 an indication to log into the service provider 314 by way of the identity provider 312. By way of example, assume a user of the user device 310 provides an indication to view a web page associated with the service provider 314. Now assume that a user provides an indication to log into the service provider 314 using user credentials generated in association with the identity provider 312. In this regard, the user may input login credentials corresponding with the identity provider 312. The user device 310 can then communicate an authentication request 322 to the identity provider 312. In response to receiving the authentication request 322, the identity provider 312 can authenticate the user, as indicated at block 324. The user device 310 also communicates an authorization request 326 to the identity provider 312. An authorization request may include a request for an authorization code. As illustrated at block 328, the identity provider 312 performs authorization. Although the authentication request 322 and authorization request 326 are illustrated as separate requests, as can be appreciated, such requests can be any number of requests including a single combined request. For example, a single request to obtain an authorization code could be communicated from the user device 310 to the identity provider 312 to trigger or initiate both authentication and authorization.

In accordance with performing authorization 328 of the service provider 314 to access resources associated with the identity provider 312, the identity provider 312 communicates an authorization code 330 from the identity provider 312 to the user device 310. As illustrated, notification data 332 may be communicated to the user device 310 for display of an identity-management notification via the user device 310. In this way, the notification data 332 may include data related to confirmation or permissions for the authentication and/or authorization performed by the identity provider 312.

Upon receiving the authorization code 330 at the user device 310, the user device 310 can communicate the authorization code 334 to the service provider 314. In embodiments, in response to receiving the authorization code 334 at the service provider 314, the service provider 314 can communicate notification data 336 to the user device 310 for display of an identity-management notification via the user device 310. Notification data 336 may include data related to authorization of the service provider 314 to access data from the identity provider 312. For example, the identity-management notification may notify the user that "an authorization code has been received by the service provider from the identity provider" or that "an access token is being requested from the identity provider"

or may provide an inquiry to the user as to whether the user "wants to give a service provider access to a profile associated with the identity provider."

The service provider 314 can communicate an access token request 338 to the service provider 314. The access token request 338 may include, for example, the authorization code, a resource scope, an identity token, a service provider identifier, or the like. In response to receiving the access token request 338, the identity provider 312 can communicate an access token 340 to the service provider 314. As illustrated in FIG. 3, in connection with receiving an access token 340, notification data 342 can be provided to the user device 310 for display of an identity-management notification via the user device 310. Notification data 342 may include data related to provisioning of resources from the identity provider 312 to the service provider 314. For example, the notification data 342 may include an indication of the resource scope about to be requested from the identity provider 312 and may enable the user to permit or deny a transmission of resources.

The access token 340 received at the service provider 314 can be used to obtain access to a set of one or more resources. In this manner, the service provider 314 can communicate a resource request 344, which can include the access token, to the identity provider 312. In some embodiments, the resource request 344 may include the requested scope of resources. In other embodiments, the scope of resources may be identified by the identity provider 312. In response to receiving the resource request 344, the identity provider 312 can provide a resource(s) 346 to the service provider 314. As can be appreciated, the scope of resources provided to the service provider 314 can correspond, for example, with permissions or preferences provided by a user of the user device 310, identity provider 312, and/or service provider 314.

As illustrated in FIG. 3, in connection with receiving a set of one or more resources 346, notification data 348 can be provided to the user device 310 for display of an identity-management notification via the user device 310. Notification data 348 may include an indication of resource scope provided to the service provider 314 from the identity provider 312. For example, the notification data 348 may include an indication that a user profile was received by the service provider 314.

Figure 5:
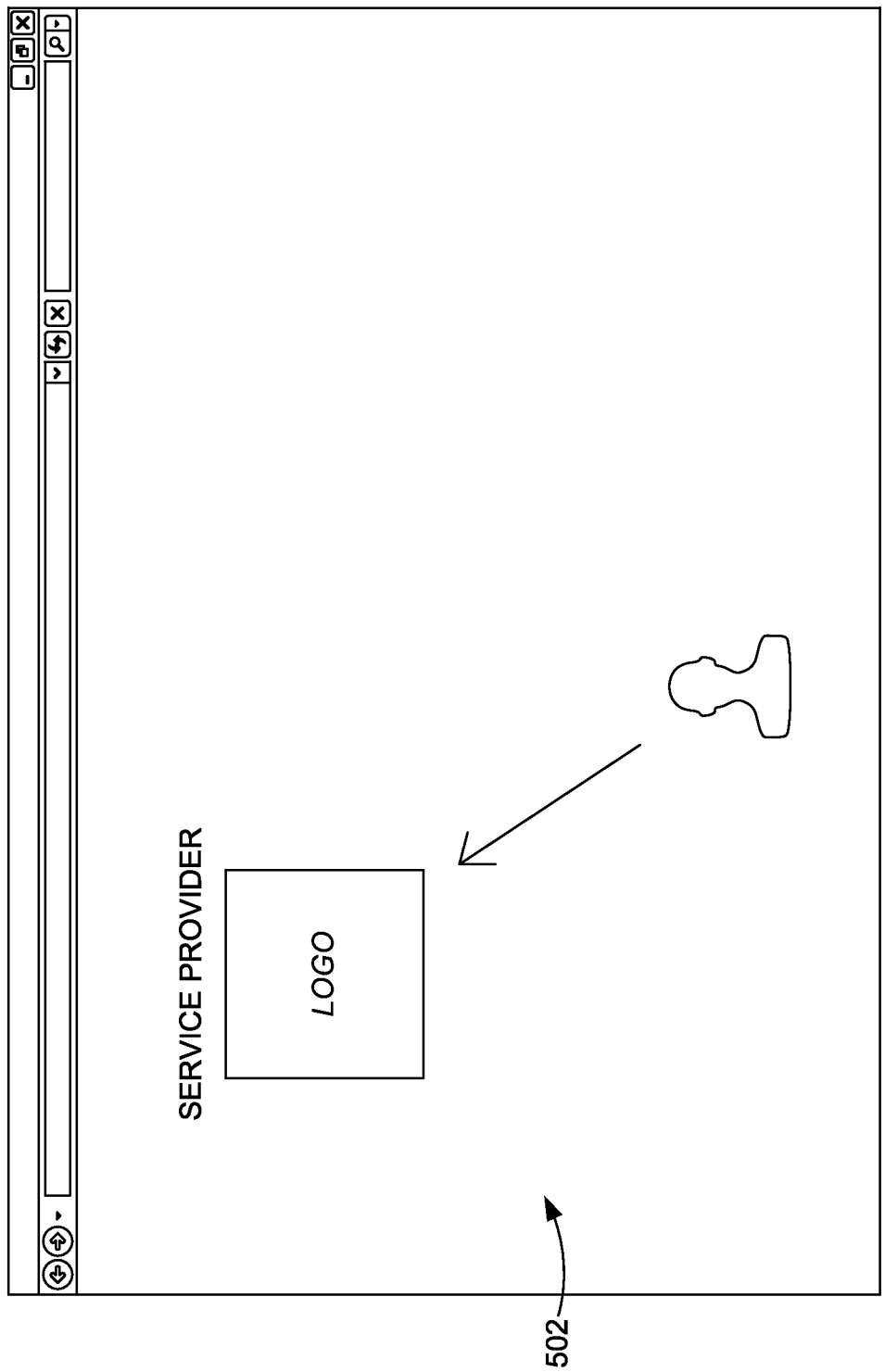
FIG. 5 is an exemplary user interface presenting a visual representation of data flow, in accordance with embodiments of the present invention.

By way of example, and with reference to FIGS. 4-11, exemplary user interfaces in accordance with embodiments of the present invention are provided. Initially, with respect to FIG. 4, a selection for a user to utilize single sign-on services is provided. A user can select the single sign-on button 402 to initiate a single sign-on process. Assume the user selects the single sign-on button 402 of FIG. 4, in such a case, an interactive visualization of the single sign-on process can be provided to the user device for display, as illustrated in FIGS. 5-11. FIG. 5 illustrates a visualization 502 of the user device connecting with a service provider, such as the service provider 114 of FIG. 1.

Figure 6:
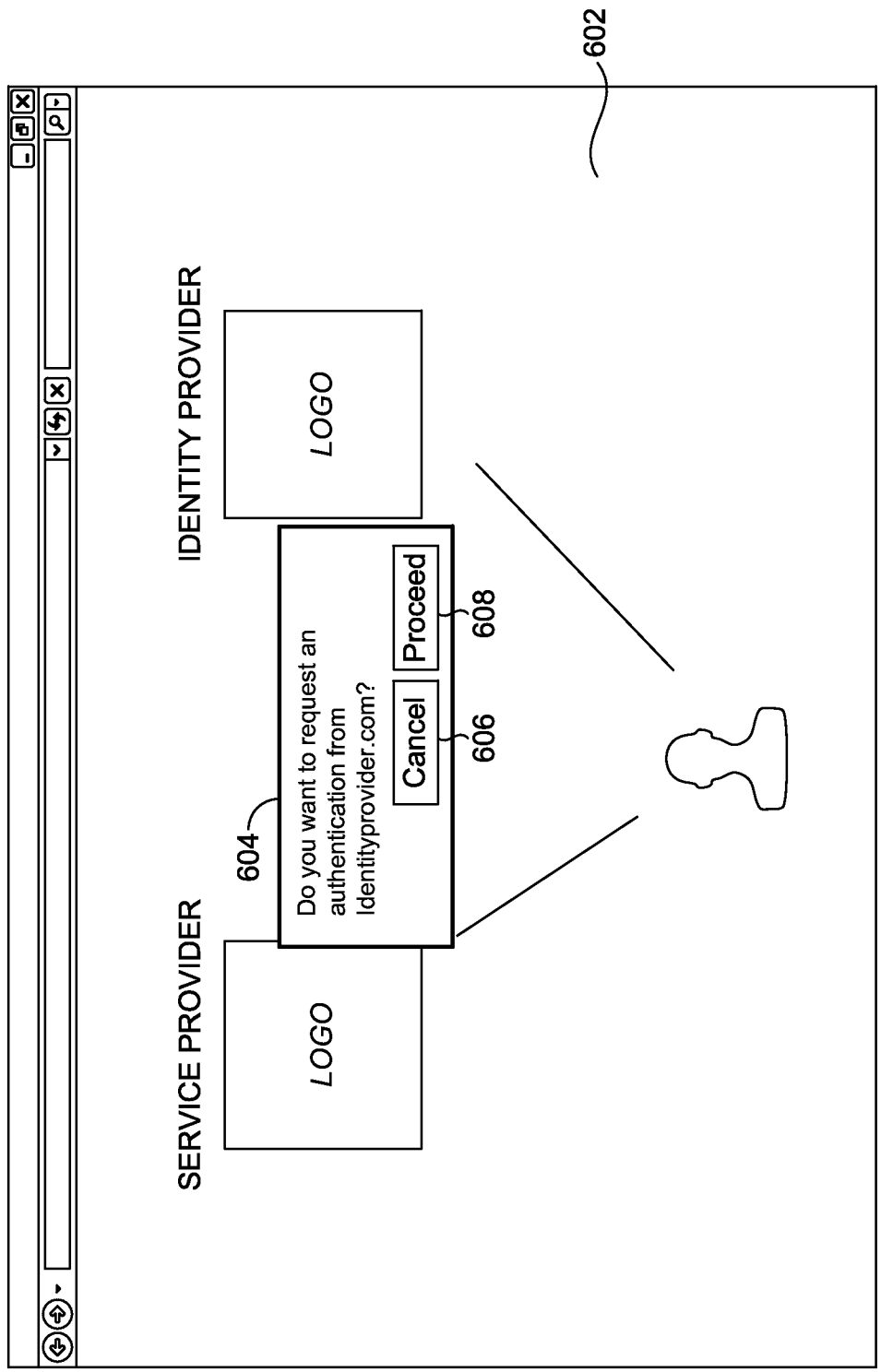
FIG. 6 is an exemplary user interface presenting a first identity-management notification, in accordance with embodiments of the present invention.

FIG. 6 illustrates a visualization 602 of the user device connecting with an identity provider, such as the identity provider 112 of FIG. 1. Further, as illustrated in FIG. 6, an identity-management notification 604 is presented to inquire whether the user would like to request an authentication from the identity provider. This provides an opportunity for identity management procedures to be more visible to and controllable by the user. As illustrated, the user may select to cancel 606 to cancel the single sign-on process or proceed 608 to continue with the single sign-on process.

Figure 7:
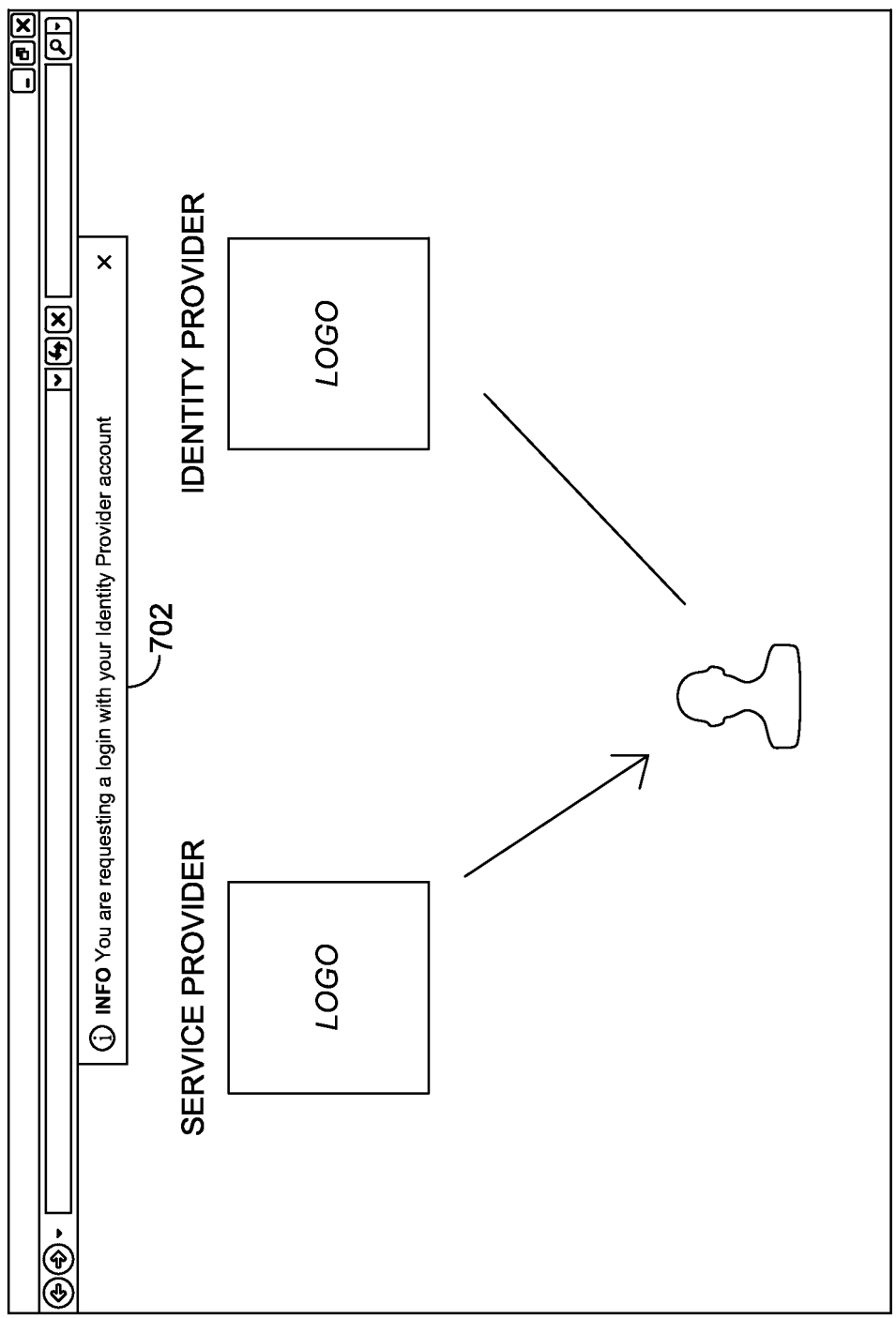
FIG. 7 is an exemplary user interface presenting a second identity-management notification, in accordance with embodiments of the present invention.
Figure 8:
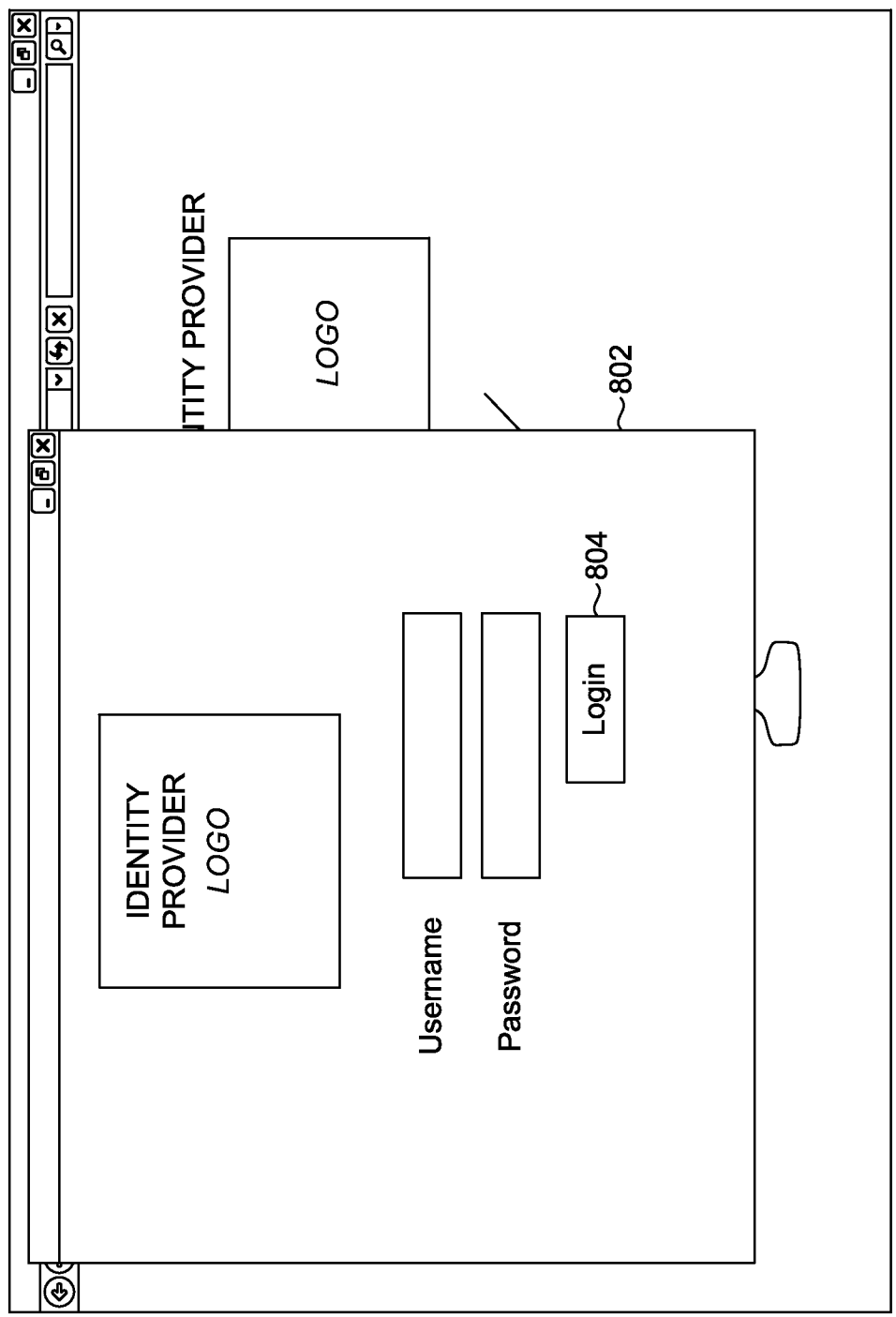
FIG. 8 is an exemplary user interface presenting an option to login using credentials associated with the identity provider, in accordance with embodiments of the present invention.
Figure 9:
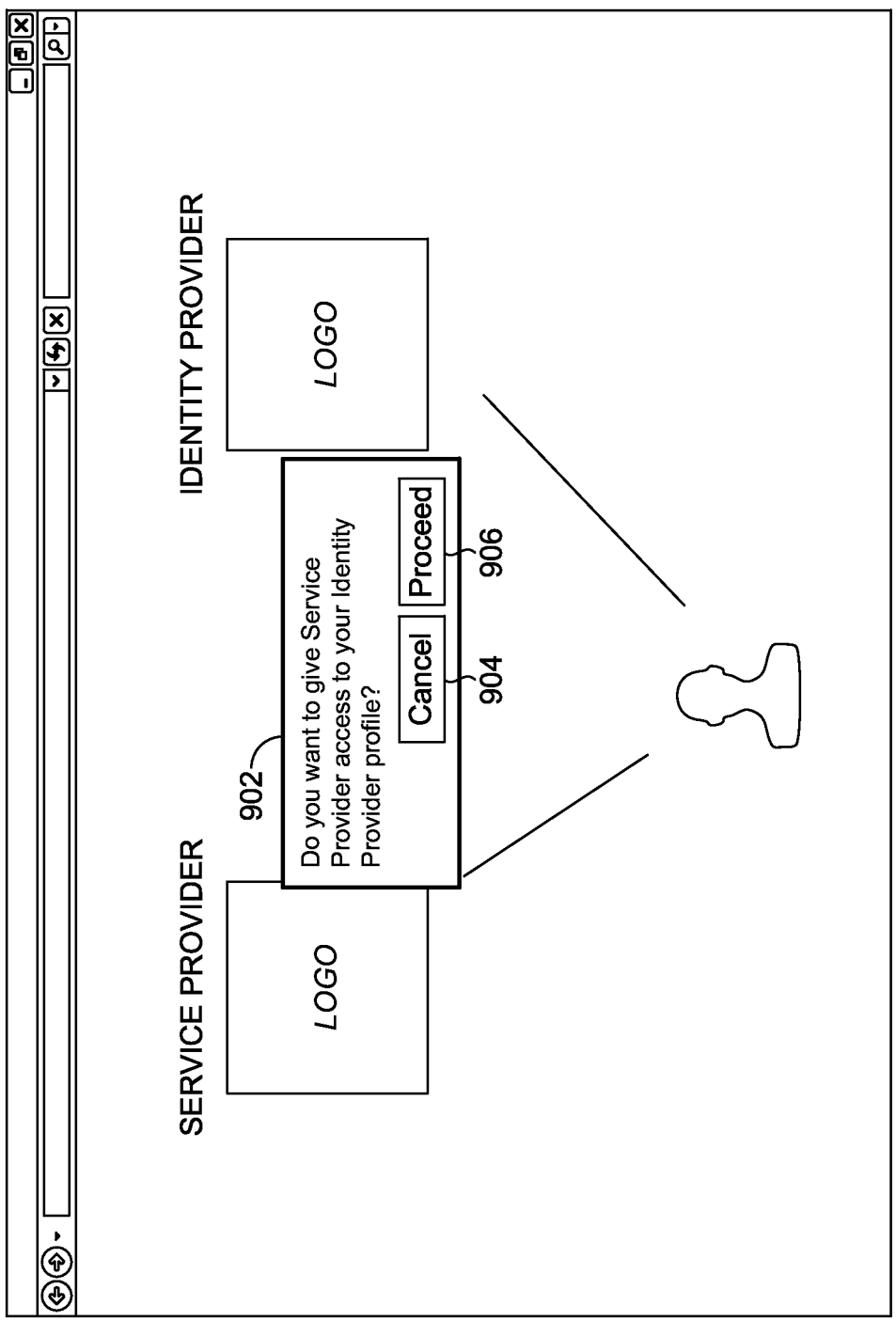
FIG. 9 is an exemplary user interface presenting a third identity-management notification, in accordance with embodiments of the present invention.
Figure 10:
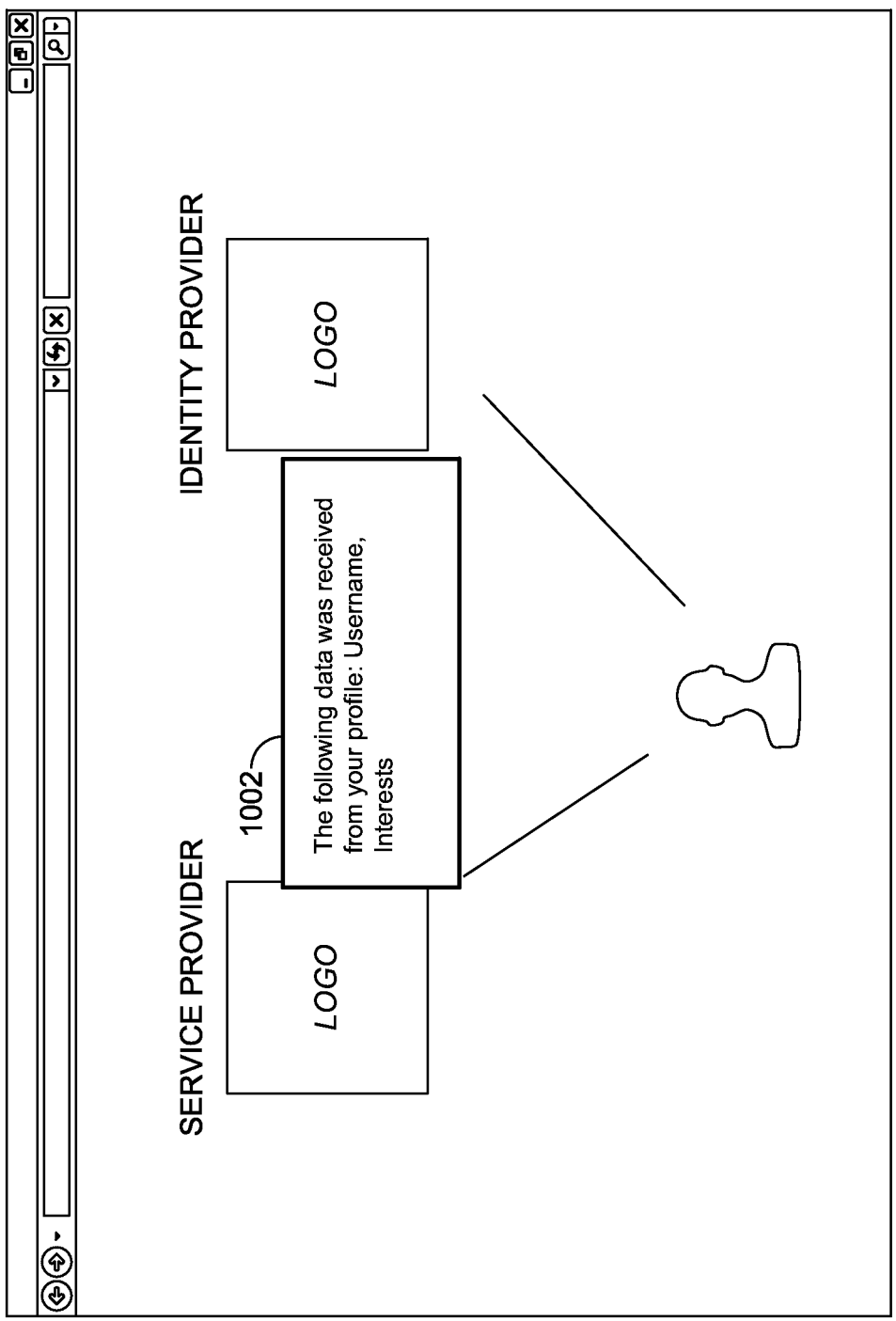
FIG. 10 is an exemplary user interface presenting a fourth identity-management notification, in accordance with embodiments of the present invention.
Figure 11:
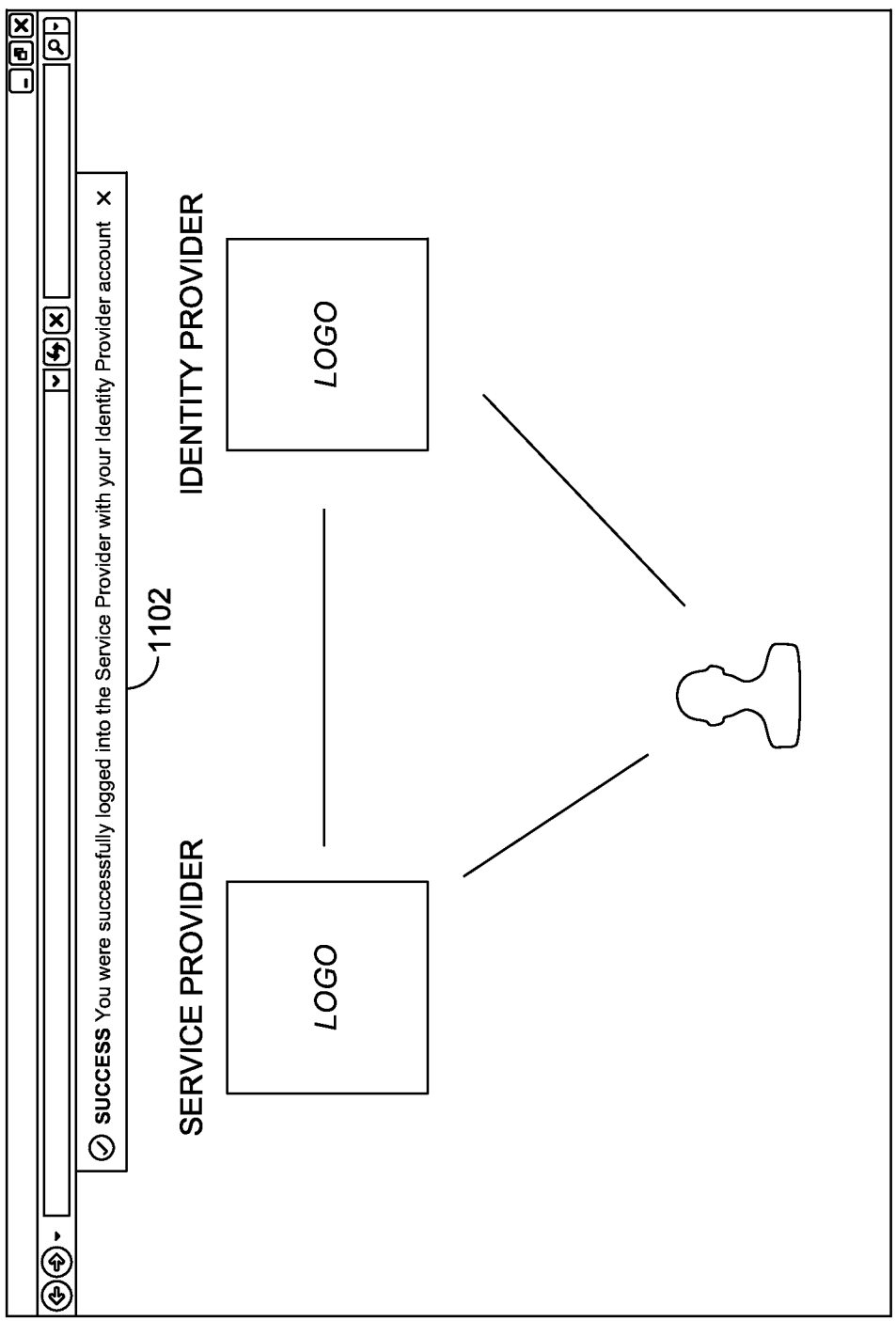
FIG. 11 is an exemplary user interface presenting a fifth identity-management notification, in accordance with embodiments of the present invention.

Assume now that a user selects to proceed 608 with the single sign-on process. As illustrated in FIG. 7, a notification 702 is presented that notifies the user of a request to login with an account associated with the identity provider. The user is provided with an opportunity to login 802 via the identity provider, as illustrated in FIG. 8. Assume further that the user enters his or her credentials and submits the login button 804 of FIG. 8, a notification 902 of FIG. 9 is presented to the user to inquire whether the user would like to permit the service provider to access a resource(s) from the identity provider. As illustrated, the user may select to cancel 904 or proceed 906. In response to the user selecting to proceed 906, a notification 1002 of FIG. 10 is presented to the user to indicate that specific resources were received. Thereafter, as illustrated in FIG. 11, a notification 1102 is presented to the user to indicate that a successful login to the service provider occurred utilizing the identity provider account.

As can be understood, embodiments of the present invention provide for, among other things, facilitating user-centric identity management. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when used by one or more computing devices, cause the one or more computing devices to perform operations at a service provider that provides at least one service to a user device, the method comprising:

receiving, at the service provider, an indication that an identity provider authenticated a user associated with the user device based on user credentials, wherein the identity provider manages identity information for authenticating a plurality of users and stores resources, wherein the service provider is not provided with the user credentials;

providing, from the service provider to the user device, a notification for display at the user device indicating that access to one or more resources stored in association with the identity provider is to be provided to the service provider, wherein the notification is provided prior to the service provider accessing the one or more resources;

upon user approval permitting access to the one or more resources stored in association with the identity provider, communicating with the identity provider to access the one or more resources, wherein the access by the service provider to the one or more resources is allowed based on a resource scope associated with the service provider that indicates a subset of media resources from among a set of media resources which the service provider is permitted to access as determined by the identity provider; and providing, from the service provider to the user device, an indication of the subset of media resources accessed from the identity provider, wherein the indication is displayable via a rendered graphical visual representation of a data flow between the user device, the service provider, and the identity provider that includes a visualization of the subset of media resources accessed from the identity provider by the service provider.

2. The one or more non-transitory computer storage media of claim 1, wherein the identity provider and the service provider are associated with different organizations.

3. The one or more non-transitory computer storage media of claim 1, wherein the one or more resources comprise user data associated with the user of the user device comprises at least one of images, photographs, videos, media, user profiles, user browsing history, social media postings, user link selections, and user search queries.

4. The one or more non-transitory computer storage media of claim 1 further comprising using an access token to obtain access to the one or more resources.

5. The one or more non-transitory computer storage media of claim 1, wherein the notification indicating that access to the one or more resources is to be provided to the service provider enables a user to prevent the provision of the one or more resources from the identity provider to the service provider.

6. A computerized method comprising:
in accordance with a first communication between a service provider that provides a service to a user device and a third-party identity provider that authorizes access to resources associated with a user of the user device, providing a first indication of the first communication to the user device to expose the first communication between the service provider and the third-party identity provider to the user of the user device, wherein the first indication is displayable via a first rendered graphical visual representation of a data flow between the user device, the service provider, and the identity provider that includes visualization of a first set of data contained in the first communication between the service provider and the third-party identity provider; and
in accordance with a second communication between the service provider and the third-party identity provider, providing a second indication of the second communication to the user device to expose the second communication between the service provider and the third-party identity provider to the user of the user device, wherein the second indication is displayable via a second rendered graphical visual representation of the data flow between the user device, the service provider, and the identity provider that includes visualization of a second set of data contained in the second communication between the service provider and the third-party identity provider,
wherein the first communication and the second communication between the service provider and the third-party identity provider facilitate access to one or more resources stored in association with the third-party identity provider being provided to the service provider, wherein the access to the one or more resources by the service provider is based on a resource scope associated with the service provider that indicates a subset of media resources from among a set of media resources which the service provider is permitted to access as determined by the identity provider, wherein the service provider is not provided with the user credentials.

7. The method of claim 6, wherein one of the first communication or the second communication between the service provider and the third-party identity provider comprises a request for an access token.

8. The method of claim 6, wherein one of the first communication or the second communication between the service provider and the third-party identity provider comprises provision of an access token.

9. The method of claim 6, wherein one of the first communication or the second communication between the service provider and the third-party identity provider comprises a request for access to the one or more resources.

10. The method of claim 6, wherein one of the first communication or the second communication between the service provider and the third-party identity provider comprises communication of the one or more resources.

11. The method of claim 6, wherein the indication of the first communication and the indication of the second communication are provided by the service provider to the user device.

12. A system comprising:
one or more processors; and
one or more computer storage media storing computer-useable instructions that, when used by the one or more processors, cause the one or more processors to:
communicate data to a user device for use in rendering a graphical visual representation of at least a portion of a data flow between the user device, a service provider, and an identity provider, wherein the service provider provides a service to the user device and the identity provider authenticates a user of the user device and authorizes the service provider to access resources stored in association with the identity provider, wherein the access by the service provider to the resources is based on a resource scope associated with the service provider that indicates a subset of media resources from among a set of media resources for which the service provider is permitted to access as determined by the identity provider, wherein user credentials are provided to the identity provider during authentication and not provided to the service provider during authentication and authorization; and
communicate to the user device an indication displayable via a rendered graphical visual representation of the data flow between the user device, the service provider, and the identity provider that includes a visualization of the subset of media resources provided to or to be provided to the service provider from the identity provider in accordance with the identity provider authorizing access to the service provider, wherein the indication of the set of the one or more resources is displayable via the user device.

13. The system of claim 12, wherein the visual representation includes at least a representation of the user device, the service provider, and the identity provider.

14. The system of claim 12, wherein the indication of the set of the one or more resources comprises images, videos, media, social network posts, user profile data, or a combination thereof.

15. The system of claim 12 further comprising access a data store that includes a mapping of the identity provider to the resource scope to identify the set of the one or more resources provided to or to be provided to the service provider from the identity provider.

* * * * *